UNITED STATES PATENT OFFICE.

MYRTIL KAHN AND FRIEDRICH RUNKEL, OF ELBERFELD, GERMANY, ASSIGNORS TO THE FARBENFABRIKEN, VORMALS FR. BAYER & CO., OF SAME PLACE.

BLACK AZO DYE.

SPECIFICATION forming part of Letters Patent No. 595,021, dated December 7, 1897.

Application filed August 6, 1897. Serial No. 647,331. (Specimens.) Patented in England December 4, 1894, No. 23,584; in France April 20, 1895, No. 246,760, and in Italy June 30, 1895, XXX, 38,758, LXXVI, 51.

*To all whom it may concern:*

Be it known that we, MYRTIL KAHN and FRIEDRICH RUNKEL, chemists, doctors of philosophy, subjects of the German Emperor, residing at Elberfeld, Prussia, Germany, (assignors to the FARBENFABRIKEN, VORMALS FR. BAYER & CO., of Elberfeld, Prussia, Germany,) have invented a new and useful Improvement in the Manufacture of Black Azo Dye, (for which the aforesaid FARBENFABRIKEN, VORMALS FR. BAYER & CO., have already obtained Letters Patent in England, No. 23,584, dated December 4, 1894; in France, No. 246,760, dated April 20, 1895, and in Italy, Reg. Gen., Vol. 30, No. 38,758, Reg. Att., Vol. 76, No. 51, dated June 30, 1895,) of which the following is a specification.

Our invention relates to the production of a new substantive black azo dye, which consists in combining one molecular proportion of the tetrazo derivative of paradiamidodiphenylaminmonosulfonic acid having the constitution formula

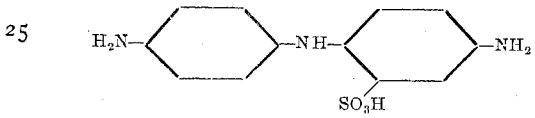

with two molecular proportions of the so-called "amidonaphtholmonosulfonic" acid G or of salts thereof, rediazotizing the product thus obtained, and finally coupling the tetrazo compound thereof with two molecular proportions of a metadiamin, such as metaphenylenediamin or metatoluylenediamin.

In carrying out our process practically we can proceed as follows: 27.9 kilos, by weight, of diamidodiphenylaminmonosulfonic acid and sixty kilos, by weight, of a thirty-six per cent. hydrochloric acid are dissolved in one thousand liters of water. This solution is carefully cooled by means of ice and gradually mixed with fourteen kilos, by weight, of sodium nitrite dissolved in seventy liters of water. The tetrazo solution thus obtained is added while stirring to a solution of forty-eight kilos, by weight, of amidonaphtholsulfonic acid G in five hundred liters of water, rendered alkaline by means of an excess of sodium carbonate. After the reaction mixture is allowed to stand for some hours in order to complete the formation of the tetrazo dyestuff it is strongly acidulated by means of hydrochloric acid, and the said dyestuff is diazotized by means of fourteen kilos, by weight, of sodium nitrite. This diazotation will be finished after about twelve hours, in case the reaction mixture is well stirred. The mixture is then stirred into a solution obtained from twenty-two kilos, by weight, of metaphenylenediamin, one thousand liters of water, and twenty-eight kilos, by weight, of sodium acetate. The formation of the dyestuff is facilitated by stirring the mixture during several hours and finally heating the same at about 60° centigrade for some while. The mixture is then rendered alkaline by means of sodium carbonate and mixed with a sufficient quantity of common salt in order to precipitate the whole dyestuff, which is then filtered off, dried, and pulverized. It represents a brownish-black powder easily soluble in hot water with a reddish brown-black color and in caustic ammonia (twenty per cent.) with a violet-black color, insoluble in alcohol, in soda-lye of 35° Baumé, and in concentrated hydrochloric acid. By concentrated sulfuric acid of 66° Baumé it is dissolved with a reddish violet-black color which changes into violet-black on the addition of a small quantity of ice, a brownish-black precipitate being separated in case a larger quantity of ice be added to the sulfuric-acid solution.

The dyestuff yields on unmordanted cotton deep-black shades, which are fast to acids and alkalies and are distinguished for their resistance toward the action of light. It has the following formula:

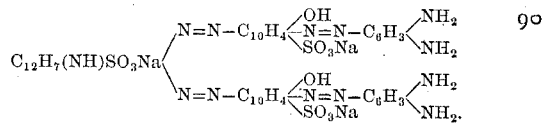

Having now described our invention and in what manner the same is to be performed, what we claim as new, and desire to secure by Letters Patent, is—

1. The process for producing a black dyestuff which process consists in combining one molecular proportion of tetrazotized paradiamidodiphenylaminsulfonic acid with two molecular proportions of amidonaphtholmonosulfonic acid G in an alkaline solution, rediazotizing the diazo dyestuff thus obtained and further combining the so-formed tetrazo compound thereof with two molecular proportions of a metadiamin, such as metaphenylenediamin or metatoluylenediamin, substantially as described.

2. As a new article of manufacture the black azo coloring-matter derived from the tetrazo compound of paradiamidodiphenylaminmonosulfonic acid and amidonaphtholsulfonic acid G by combination with a metadiamin, such as metaphenylendiamin and metatoluylenediamin, having when metaphenylenediamin is employed the formula

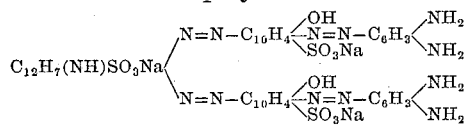

forming a brownish-black powder, easily soluble in hot water with a reddish brown-black color and in caustic ammonia (twenty per cent.) with a violet-black color, insoluble in alcohol, in concentrated hydrochloric acid and in strong soda-lye (35° Baumé), soluble in concentrated sulfuric acid (66° Baumé) with a reddish violet-black color, which turns into violet-black on the addition of a small quantity of ice, while a brownish-black precipitate is obtained on the addition of a larger quantity of ice to the sulfuric-acid solution, yielding on unmordanted cotton deep-black shades which are fast to light, to acids and to alkalies, substantially as described.

In testimony whereof we have signed our names in the presence of two subscribing witnesses.

MYRTIL KAHN.
FRIEDRICH RUNKEL.

Witnesses:
H. T. HESS,
OTTO KONIG.